United States Patent
Roehm

(10) Patent No.: US 8,070,845 B2
(45) Date of Patent: Dec. 6, 2011

(54) DUST COLLECTING DEVICE

(75) Inventor: Heiko Roehm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 395 days.

(21) Appl. No.: 12/440,497

(22) PCT Filed: Feb. 19, 2008

(86) PCT No.: PCT/EP2008/051959
§ 371 (c)(1),
(2), (4) Date: Mar. 9, 2009

(87) PCT Pub. No.: WO2008/128799
PCT Pub. Date: Oct. 30, 2008

(65) Prior Publication Data
US 2010/0037571 A1 Feb. 18, 2010

(30) Foreign Application Priority Data
Apr. 18, 2007 (DE) .................. 10 2007 017 550

(51) Int. Cl.
*A47L 5/38* (2006.01)
(52) U.S. Cl. ........ 55/385.1; 55/373; 55/374; 55/DIG. 3; 173/71; 173/73; 451/87; 451/88; 451/453
(58) Field of Classification Search .............. 55/385.1, 55/373, 369, 478, DIG. 3; 15/314, 315, 323, 15/347, 352; 173/71, 73; 451/87, 88, 270, 451/354, 357, 451, 453, 456
See application file for complete search history.

(56) References Cited

U.S. PATENT DOCUMENTS

| 2,742,105 | A | * | 4/1956 | Dow ............................. 96/404 |
| 4,545,794 | A | * | 10/1985 | Himukai ...................... 55/362 |
| 5,028,245 | A | | 7/1991 | Stein et al. |
| 5,349,752 | A | | 9/1994 | Stirm |
| 6,502,274 | B1 | * | 1/2003 | Harrelson, II .............. 15/314 |
| 6,560,816 | B1 | * | 5/2003 | Harrelson, II .............. 15/314 |

FOREIGN PATENT DOCUMENTS

| DE | 39 15 084 | 6/1990 |
| EP | 0 558 253 | 9/1993 |
| EP | 1 510 291 | 3/2005 |

* cited by examiner

Primary Examiner — Duane Smith
Assistant Examiner — Minh-Chau Pham
(74) Attorney, Agent, or Firm — Michael J. Striker

(57) ABSTRACT

A dust collecting device for a handheld power tool equipped with a dust exhaust fitting (12), in particular for an electric handheld power sander, includes a dust collecting bag (14) that has an air-permeable filter bag (15) and a reinforcing plate (16). The reinforcing plate (16) is situated in front of the filter bag (15) and has an inlet opening (17) that fits onto the dust exhaust fitting (12). A support is attached to the handheld power tool and has a filter chamber (20) for insertion of the filter bag (15) and a receiving chamber (21) situated in front of the filter chamber (20) for insertion of the reinforcing plate (16).

6 Claims, 3 Drawing Sheets

DUST COLLECTING DEVICE

CROSS-REFERENCE

The invention described and claimed hereinbelow is also described in PCT/EP2008/051959, filed Feb. 19, 2008 and DE 10 2007 017 550.9, filed on Apr. 18, 2007. This German Patent Application, whose subject matter is incorporated here by reference, provides the basis for a claim of priority of invention under 35 U.S.C. 119 (a)-(d).

BACKGROUND OF THE INVENTION

The invention is based on a dust collecting device for a handheld power tool equipped with a dust exhaust fitting, in particular for an electric handheld power sander.

Known dust collecting devices for handheld electric power tools such as orbital sanders, eccentric sanders, or belt sanders have a dust collecting bag composed of a flexible filter bag made of filter paper or filter cloth and a reinforcing plate that holds open the sack opening and that is equipped with an inlet opening to permit the entry of dust. This reinforcing plate is composed, for example, of a glued cardboard. The inlet opening of the cardboard is slid onto the dust collecting fitting of the handheld power tool; the cardboard must be rigid in order to overcome the friction forces. The tightness of the seal between the dust exhaust fitting and the dust collecting bag is assured either by the expansion of the cardboard around the inlet opening or by a rubber seal that is situated behind and around the inlet opening, radially encompassing the dust exhaust fitting; its friction forces are oriented parallel in both the attaching and detaching directions. In order to stabilize the flexible filter bag, usually an additional retaining element is used that is fastened to the machine housing.

DISCLOSURE SUMMARY OF THE INVENTION

The dust collecting device according to the invention has the advantage that the support that holds the dust collecting bag makes it significantly easier and more ergonomic for the user to attach and detach the dust collecting device to and from the dust exhaust fitting of the handheld power tool. The dust collecting bag is inserted into the support and by means of the support, is placed onto the dust exhaust fitting in a dust-tight fashion; the large grasping surface of the support makes it significantly easier to maneuver. The support also protects the filter bag from damage and provides it with support. It is no longer necessary to provide the handheld power tool with additional retaining elements for the dust collecting bag in order to prevent the dust collecting bag from sagging or drooping as it fills. The filter area of the filter bag can be fully utilized. The reinforcing plate secured in the receiving chamber can be embodied as slimmer so that the dust collecting bag as a whole can be more inexpensively embodied from a production standpoint.

According to a preferred embodiment of the invention, at its front end oriented toward the handheld power tool, the support has a hinge piece for detachably connecting to a hinge piece of a swivel joint situated on the machine. Through a suitable placement and embodiment of the swivel joint, the inlet opening of the reinforcing plate is slid onto the dust exhaust fitting through a simple pivoting of the support. The resulting lever action of the support on the reinforcing plate achieves a controlled sliding of the reinforcing plate without any abrupt behavior occurring due to the transition from adhesive friction to sliding friction between the reinforcing plate and the dust exhaust fitting.

BRIEF DESCRIPTION OF THE DRAWINGS

The invention will be explained in greater detail in the following description, which is given in conjunction with an exemplary embodiment shown in the drawings.

DETAILED DESCRIPTION OF THE PREFERRED EMBODIMENTS

Figure 1:
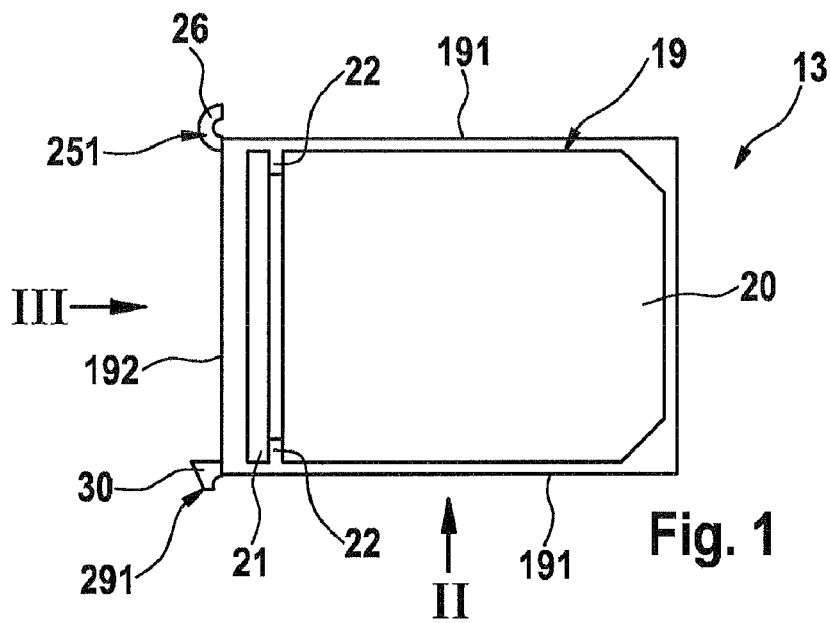
FIG. 1 is a top view of a support of a dust collecting device for a handheld power tool with a grinding or cutting tool.
Figure 2:
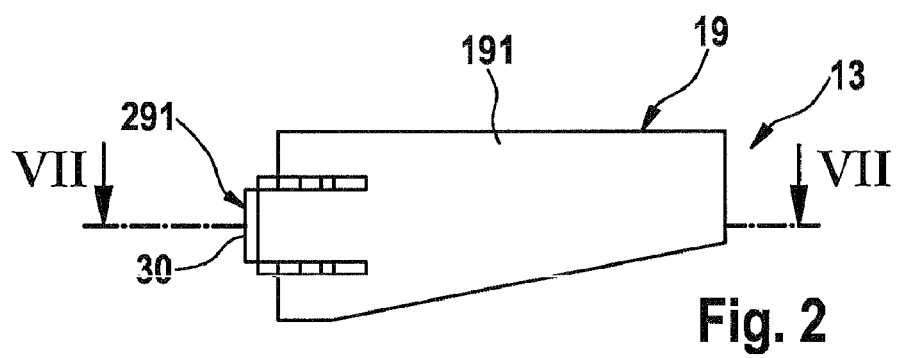
FIG. 2 is a side view of the support in the direction of arrow II in FIG. 1.
Figure 3:
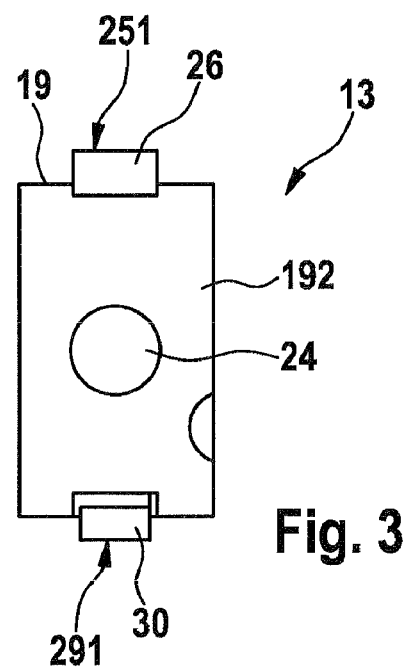
FIG. 3 is an end view of the support in direction III in FIG. 1.
Figure 4:
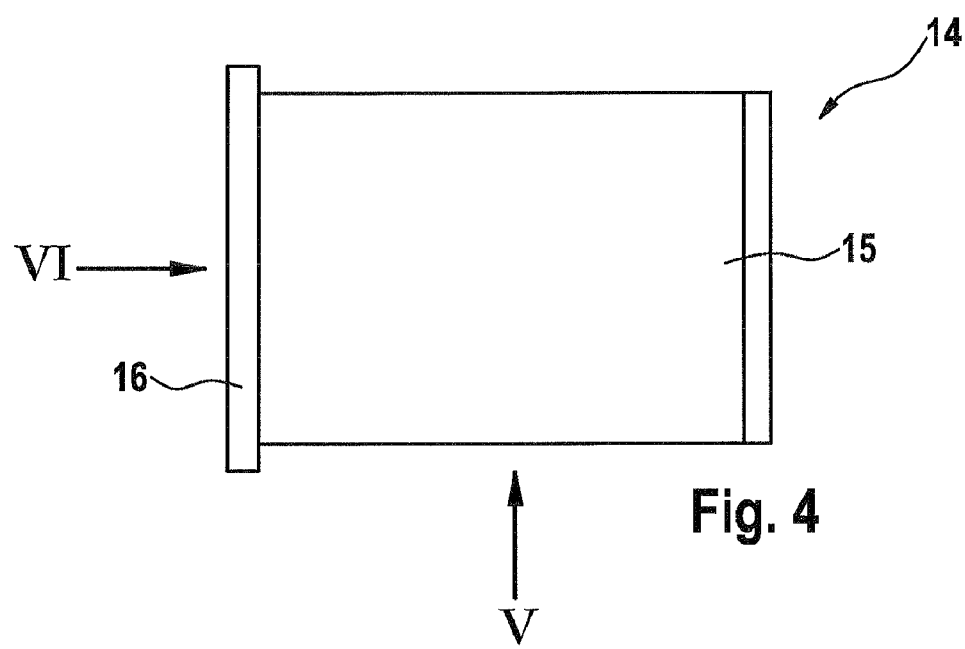
FIG. 4 is a top view of a dust collecting bag of the dust collecting device.
Figure 5:
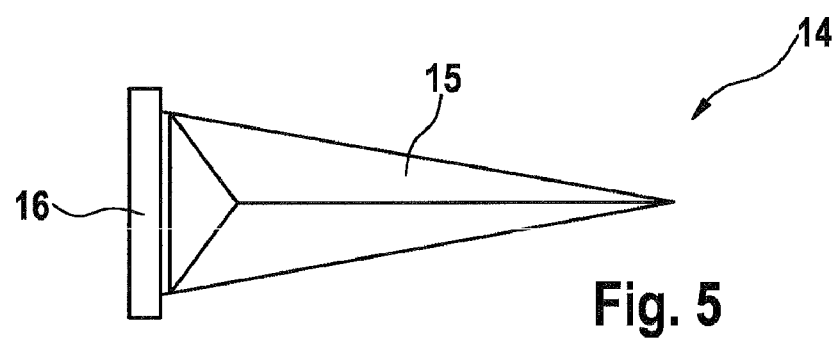
FIG. 5 is a side view of the dust collecting bag in the direction of arrow V in FIG. 4.
Figure 6:
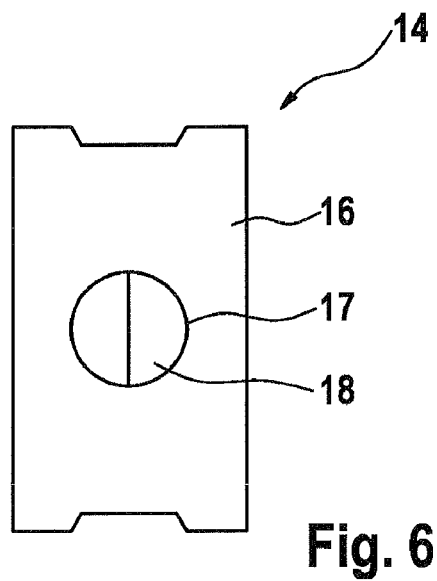
FIG. 6 is a front view of the dust collecting bag in the direction of arrow VI in FIG. 4.
Figure 7:
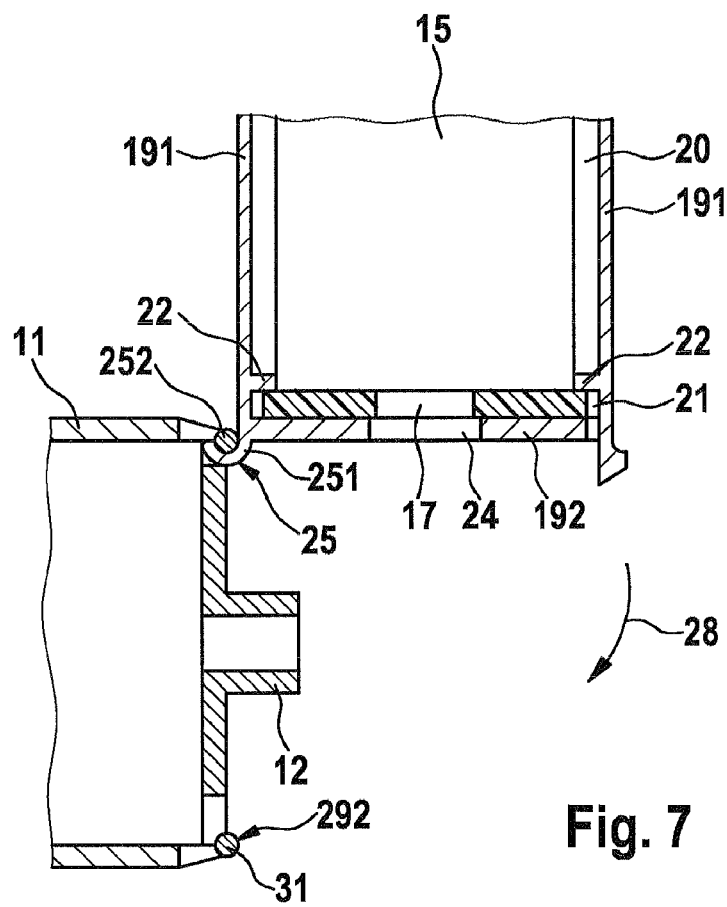
FIG. 7 is a detail view of a longitudinal section along line VII-VII in FIG. 2 of the support with an inserted dust collecting bag, attached to a handheld power tool before being pivoted into the operating position.
Figure 8:
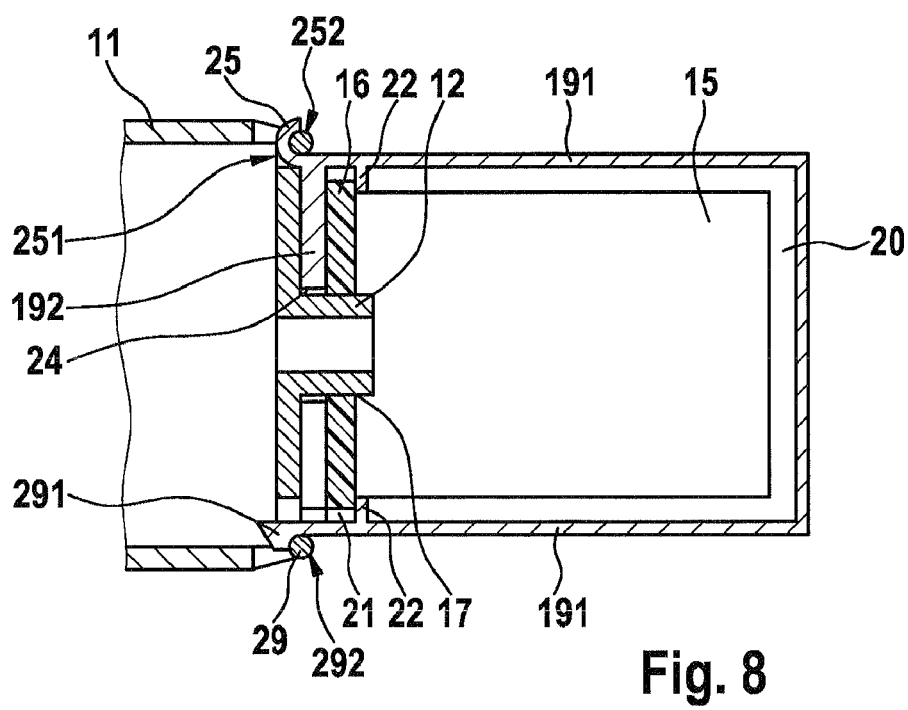
FIG. 8 is the same depiction as in FIG. 7, after being pivoted into the operating position.

The dust collecting device, shown in a longitudinal section in FIGS. 7 and 8 and individual parts of which are shown in FIGS. 1 through 6, is intended for a handheld power tool with a grinding or cutting tool, e.g. an electric handheld sander such as an orbital sander, eccentric sander, or band sander, but also a handheld power saw or power planer, and is conceived for being attached to and detached from the machine housing 11 of the handheld power tool in the vicinity of a dust exhaust fitting 12 provided on the machine housing 11 of the handheld power tool. To this end, the dust collecting device has a support 13, various views of which are shown in FIGS. 1 through 3, into which is inserted a dust collecting bag 14, various views of which are shown in FIGS. 4 through 6. The intrinsically known dust collecting bag 14 has an air-permeable filter bag 15 made of filter paper or filter cloth and a reinforcing plate 16 made of plastic or cardboard that is placed in front of the filter bag 15. The reinforcing plate 16 holds open the opening of the flexible filter bag 15 and is provided with a central inlet opening 17 (FIG. 6) for the dust-laden airflow. Behind and around the inlet opening 17, a sealing lip 18 (FIG. 6) is usually also provided, which is fastened to the reinforcing plate 16 and serves to produce a dust seal in relation to the dust exhaust fitting 12 on the machine housing 11.

The support 13, which preferably has a housing 19 manufactured out of plastic, metal, or rubber, for example, and is provided with openings, contains a filter chamber 20 for insertion of the filter bag 15 and, situated in front of the filter chamber 20, a frame-like receiving chamber 21 for insertion of the reinforcing plate 16. The partition-like structure of the housing 19 that continues on from the base into the side walls of the housing 19 is not shown in the drawing for the sake of clarity. The receiving chamber 21, which is open to the filter chamber 20, is divided from the filter chamber 20 by means of two guide struts 22 and is delimited by the front wall 192 of the housing 19. The guide struts 22 extend parallel to the front wall 192 spaced apart from it by a distance slightly greater than the thickness of the reinforcing plate 16 of the dust collecting bag 14 and protrude from the opposite side walls 191 of the housing 19. The housing 19 is open at the top so that both the filter chamber 20 and the receiving chamber 21 are freely accessible and the dust collecting bag 14 can be inserted from above into the housing 19 of the support 13. The reinforcing plate 16 is inserted into the receiving chamber 21 and the filter bag 15 is inserted into the filter chamber 20. The front wall 192 of the housing 19 visible in FIG. 3 has a central opening 24 that is situated so that when the reinforcing plate 16 is inserted into a flush position, the central opening 24 is coaxial to the inlet opening 17 in the reinforcing plate 16 of the dust collecting bag 14. The central opening 24 advantageously has a slightly larger inner diameter than the inlet opening 17, as is visible in FIGS. 7 and 8.

In order to attach the dust collecting device to the machine housing 11 of the handheld power tool, a hinge piece 251 is provided lateral to the front wall 192 of the housing 19 and can be assembled with a hinge piece 252 situated on the machine housing 11 to form a swivel joint 25. The rotation axis of the swivel joint 25 is oriented parallel to the insertion direction of the reinforcing plate 16 into the receiving chamber 21, in a transverse plane oriented perpendicular to the axis of the dust exhaust fitting 12 on the machine housing 11. The hinge piece 251 situated on the support is embodied in the form of a shell 26 and the hinge piece 252 situated on the machine is embodied in the form of a pin 27, which is partially encompassed by the shell 26 when the swivel joint 25 is assembled. The assembly of the swivel joint 25 occurs when the support 13 is placed against the machine housing 11, for which the axes of the machine housing 11 and support 13 must be oriented at approximately 90° to each other, as shown in FIG. 7. Then, the support 13 can be pivoted against the machine housing 11 in the direction of arrow 28. When the support 13 is pivoted with an inserted dust collecting bag 14, the inlet opening 17 with the sealing lip 18 of the reinforcing plate 16 of the dust collecting bag 14 is slid onto the dust exhaust fitting 12 on the machine housing 11 and the dust exhaust fitting 12 protrudes partway into the filter bag 15 through the central opening 24 and the inlet opening 17. Because the support 13 is guided spaced apart from the pivot axis and therefore exerts a lever action on the reinforcing plate 16, the friction forces of the inlet opening 17 and sealing lip 18 on the dust exhaust fitting 12 are overcome in a controlled fashion. The reinforcing plate 16 rests firmly against the dust exhaust fitting 12 and the sealing lip 18 has encompassed the dust exhaust fitting 12. The sealing lip 18 is not shown in FIGS. 7 and 8. Because the dust exhaust fitting 12 protrudes at least partway into the filter bag 15 through the inlet opening 17 in the reinforcing plate 16, the dust collecting bag 14 cannot be removed from the housing 19 once the dust collecting device has been pivoted against the machine housing 11 (FIG. 8).

In order to detachably lock the support 13 against the machine housing 11 after achieving the operating position of the dust collecting device as shown in FIG. 8, a detent element 291 is provided on the other side of the front wall 192 of the housing 19 opposite from the hinge piece 251 situated on the support; the detent element 291 produces a detent connection 29 with a detent element 292 situated on the machine housing 11. The detent element 291 situated on the support is embodied here by way of example in the form of a detent hook 30 and the detent element 292 situated on the machine is embodied in the form of a detent pin 31 that the detent hook 30 engages behind in a frictional, nonpositive fashion.

What is claimed is:

1. A dust collecting device for a handheld power tool equipped with a dust exhaust fitting (12) for an electric handheld power sander, comprising:
    a dust collecting bag (14) having an air-permeable filter bag (15) and a reinforcing plate (16) positioned in front of the filter bag (15) and having an inlet opening (17) for being slid onto the dust exhaust fitting (12);
    a support (13) attached to the handheld power tool, said support (13) having a filter chamber (20) for insertion of the filter bag (15) and a receiving chamber (21) situated in front of the filter chamber (20) for insertion of the reinforcing plate (16),
    wherein the support (13), on in its front end delimiting the receiving chamber (21) on the side oriented away from the filter chamber (20), has a hinge piece (251) for being detachably connected to a hinge piece (252) of a swivel joint (25) situated on the handheld power tool, which joint is embodied in such a way that pivoting the support (13) against the handheld power tool slides the inlet opening (17) in the reinforcing plate (16) of the dust collecting bag (14), which reinforcing plate (16) is situated in the receiving chamber (21), onto the dust exhaust fitting (12) of the handheld power tool (11),
    wherein the hinge piece (251) situated on the support is situated on the one side of the support in the working position and on the other side of the support opposite from the hinge piece (251), a detent element (291) is provided, which cooperates with a detent element (292) situated on the machine in order to produce a detent connection (29),
    wherein the detent connection (29) is produced at the end of the pivoting of the support (13) against the handheld power tool, which pivoting occurs after the pivot joint (25) has been produced, and
    wherein the support (13) has a housing (19) that is open at the top in which the receiving chamber (21) and the filter chamber (20) are accessible from above, wherein the receiving chamber (21) is delimited by the front wall (192) of the housing (19) and by two guide struts (22) extending parallel to the front wall (192), wherein one of said guide struts protrudes from a side wall (191) of the housing (19), and wherein the front wall (192) of the housing (19) has a central opening (24) coaxial to the inlet opening (17) of the dust collecting bag (14) that is inserted into the housing.

2. The dust collecting device as recited in claim 1, wherein the support (13), on in its front end delimiting the receiving chamber (21) on the side oriented away from the filter chamber (20), has a hinge piece (251) for being detachably connected to a hinge piece (252) of a swivel joint (25) situated on the handheld power tool, which joint is embodied in such a way that pivoting the support (13) against the handheld power tool slides the inlet opening (17) in the reinforcing plate (16) of the dust collecting bag (14), which reinforcing plate (16) is situated in the receiving chamber (21), onto the dust exhaust fitting (12) of the handheld power tool (11),
    wherein the hinge piece (251) situated on the support is embodied in the form of a shell (26) and the hinge piece (252) situated on the machine is embodied in the form of a pin (27) that the shell (26) is able to partially encompass.

3. The dust collecting device as recited in claim 1, wherein the hinge piece (251) situated on the support is situated on the one side of the support in the working position and on the other side of the support opposite from the hinge piece (251), a detent element (291) is provided, which cooperates with a detent element (292) situated on the machine in order to produce a detent connection (29),
> wherein the detent connection (29) is produced at the end of the pivoting of the support (13) against the handheld power tool, which pivoting occurs after the pivot joint (25) has been produced, and
> wherein the detent element (291) situated on the support is embodied the form of a detent hook (30) and the detent element (292) situated on the machine is embodied in the form of a detent pin (31) that the detent hook (30) is able to engage around.

4. The dust collecting device as recited in claim 1, wherein the distance of the guide struts (22) from the front wall (192) of the housing (19) is slightly greater than the thickness of the reinforcing plate (16) of the dust collecting bag (14).

5. A dust collecting device for a handheld power tool equipped with a dust exhaust fitting (12) for an electric handheld power sander, comprising:
> a dust collecting bag (14) having an air-permeable filter bag (15) and a reinforcing plate (16) positioned in front of the filter bag (15) and having an inlet opening (17) for being slid onto the dust exhaust fitting (12);
> a support (13) attached to the handheld power tool, said support (13) having a filter chamber (20) for insertion of the filter bag (15) and a receiving chamber (21) situated in front of the filter chamber (20) for insertion of the reinforcing plate (16),
> wherein the support (13), on in its front end delimiting the receiving chamber (21) on the side oriented away from the filter chamber (20), has a hinge piece (251) for being detachably connected to a hinge piece (252) of a swivel joint (25) situated on the handheld power tool, which joint is embodied in such a way that pivoting the support (13) against the handheld power tool slides the inlet opening (17) in the reinforcing plate (16) of the dust collecting bag (14), which reinforcing plate (16) is situated in the receiving chamber (21), onto the dust exhaust fitting (12) of the handheld power tool (11).

6. A dust collecting device for a handheld power tool equipped with a dust exhaust fitting (12) for an electric handheld power sander, comprising:
> a dust collecting bag (14) having an air-permeable filter bag (15) and a reinforcing plate (16) positioned in front of the filter bag (15) and having an inlet opening (17) for being slid onto the dust exhaust fitting (12);
> a support (13) attached to the handheld power tool, said support (13) having a filter chamber (20) for insertion of the filter bag (15) and a receiving chamber (21) situated in front of the filter chamber (20) for insertion of the reinforcing plate (16),
> wherein the hinge piece (251) situated on the support is embodied in the form of a shell (26) and the hinge piece (252) situated on the machine is embodied in the form of a pin (27) that the shell (26) is able to partially encompass.

* * * * *